United States Patent Office 3,560,582
Patented Feb. 2, 1971

3,560,582
NOVEL POLYCYCLIC COMPOSITIONS AND
PROCESS FOR PREPARATION
Gerhard F. Schroder, Karlsruhe, Germany
No Drawing. Continuation of application Ser. No.
411,127, Nov. 13, 1964, which is a continuation-in-part
of application Ser. No. 348,284, Feb. 28, 1964. This
application June 6, 1969, Ser. No. 834,587
Int. Cl. C07c *3/00, 13/00*
U.S. Cl. 260—666                                1 Claim

ABSTRACT OF THE DISCLOSURE

A novel class of tricyclo [3.3.2.0$^{4,6}$]deca-2,7,9-trienes is prepared by the irradiation of a dimer of cyclo-octatetraene to obtain tricyclo[3.3.2.0$^{4,6}$]deca-2,7,9-triene from which other derivatives are then synthesized.

This application is a continuation of Ser. No. 411,127 filed Nov. 13, 1964 by G. F. Schroder, now abandoned. Ser. No. 411,127 is in turn a continuation-in-part of Ser. No. 348,284, filed Feb. 28, 1964 by G. F. Schroder, now abandoned.

This invention relates to novel polycyclic compositions and to a process for their preparation. In one aspect, this invention relates to substituted tricyclo[3.3.2.0$^{4,6}$]deca-2,7,9-trienes and novel derivatives of substituted and unsubstituted tricyclo[3.3.2.0$^{4,6}$]deca-2,7,9-trienes.

The novel polycyclic compositions which can be prepared by the process of the instant invention can conveniently be represented by the following general formulae:

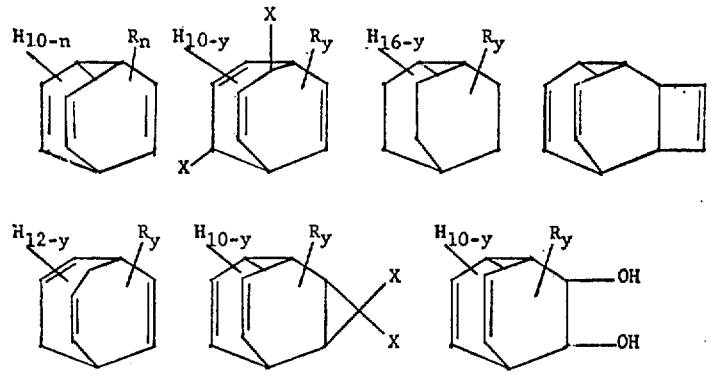

wherein R represents a monovalent organic or inorganic radical; X represents halogen; $n$ has a value of from 1 to 10, preferably 1 to 4, and $y$ has a value of from 0 to 4.

Illustrative compositions encompassed by the aforementioned formulae and which can be prepared by the process of the instant invention include, among others, methyl - tricyclo[3.3.2.0$^{4,6}$]deca-2,7,9-triene, propyl-tricyclo - [3.3.2.0$^{4,6}$]deca - 2,7,9 - triene, bromo - tricyclo [3.3.2.0$^{4,6}$] - deca - 2,7,9 - triene, dibromo - tricyclo [3.3.2.0$^{4,6}$]deca - 2,7,9-triene, tertiary - butoxy - tricyclo [3.3.2.0$^{4,6}$]deca - 2,7,9 - triene, 2,6 - dibromo - bicyclo [3.3.2.]deca - 3,7,9 - triene, tribromo-tricyclo-[3.3.2.0$^{4,6}$] deca-2,7-diene, 3,3-dichloro - tetracyclo [4.3.2.0$^{2,4}$0$^{5,7}$]-undeca - 8,10 - diene, 2-3-dihydroxy-tricyclo[3.3.2.0$^{4,6}$] deca - 7,9 - diene, bicyclo[3.3.2]deca - 3,7,9-triene, tricyclo [3.3.2.0$^{4,6}$]decane and the like.

The novel polycyclic compositions of this invention are useful in a variety of applications as hereinafter indicated under the respective embodiments. Many of the novel compositions due to the presence of functional groups react readily with other compounds such as alcohols, amines, acids to form new and valuable products. Moreover, the olefinic bonds in some of the novel compositions can be epoxidized to give compounds which are useful as stabilizers for various resin systems. Additionally, many of the unsaturated polycyclic compounds are relatively reactive materials which homopolymerize or copolymerize readily with other reactive cyclic monomers to provide a useful class of polymeric compounds. These polymers can range from viscous liquids to extremely tough solids. The very viscous liquids of relatively low molecular weight, are useful in the preparation of polishes, and waxes, and as thickening agents for various lubricants. The polymers can be employed as protective coatings and impregnants. These polymers are also useful for the production of various shaped articles such as brush handles, buttons, lamp bases, toys and the like. In view of the fact many of the compositions are polyfunctional, in that each compound contains at least two reactive groups in the molecule, they are particularly useful in those fields of application where polyfunctionality is desired, for example, polyols, polyisocyanates, and the like. Of particular interest, as hereinafter indicated, are the substituted tricyclo[3.3.2.0$^{4,6}$]deca-2,7,9-trienes which exhibit unique properties not heretofore known in an organic molecule. In view of these properties, these compositions are useful in numerous applications, such as, for example, agricultural applications.

It is, therefore, an object of the present invention to provide novel polycyclic compositions which are suitable for use in a wide variety of fields. Another object is to provide new compositions of matter comprising substituted tricyclo-[3.3.2.0$^{4,6}$]deca-2,7,9-trienes. A further object of this invention is to provide novel derivatives of substituted and unsubstituted tricyclo[3.3.2.0$^{4,6}$]deca-2,7,9-trienes. Another object of this invention is to provide novel compositions having at least on reactive group. A still further object of the present invention is to provide novel compounds having polyfunctional properties. Another object of the present invention is to provide a novel process for the preparation of the aforesaid compositions. These and other objects will readily become apparent to those skilled in the art in the light of the teachings herein set forth.

In its broad aspect, this invention is directed to novel substituted tricyclo[3.3.2.0$^{4,6}$]deca - 2,7,9 - trienes and novel derivatives of substituted and unsubstituted tricyclo [3.3.2.0$^{4,6}$]deca - 2,7,9 - trienes and to a process for their preparation.

In the first embodiment of this invention, the novel substituted compositions are those represented by the general formula:

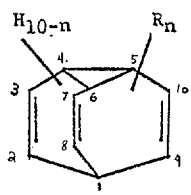

wherein R represents a monovalent organic or inorganic radical, as hereinafter defined, and n has a value of from 1 to 10, more preferably from 1 to 4, and still more preferably from 1 to 2. Preferred compounds are those wherein R represents a monovalent radical, such as alkyl, alkenyl, alkoxy, alkoxyalkyl, alkyloxycarbonyl, carboxyl, haloalkyl, hydroxyalkyl, amino, alkylamino, dialkylamino,, aminoalkyl, aminoalkoxy, alkylaminoalkoxy, dialkylaminoalkoxy, isocyanato, isocyanatoalkyl, halo, and the like. Also preferred are polycyclic compounds of the aforesaid formula wherein R contains from 1 to 12 carbon atoms, more preferably 1 to 6 carbon atoms, and still more preferably from 1 to 2 carbon atoms. When more than one R variable is present in the same molecule of the compositions of the aforesaid formula, they need not necessarily be the same and can represent different groups.

While not wishing to be bound by any particular theory regarding the mechanism responsible for the numerous possible position isomers of the compounds of the aforesaid formula, it is believed that a clearer understanding will be had if the unique characteristics and properties of the tricyclo[3.3.2.0$^{4,6}$]deca-2,7,9-triene ring structure are briefly outlined.

In a recent article by W. Von E. Doering and W. R. Roth, Agnew, Chem. 75, 27 (1963); Agnew. Chem. Internat. Edit. 2, 122 (1963); and tetrahedron 19, 715 (1963), directed to the Cope rearrangement of various dienes and trienes, tricyclo[3.3.2.0$^{4,6}$]deca-2,7,9-triene was proposed as a hypothetical and a uniquely interesting ring structure. It was theorized that if the Cope rearrangement operates for the proposed structure, no two carbon atoms of the compound would remain bonded to each other, and all ten carbon atoms would wander over the surface of a sphere in an ever changing relationship to each other. This rapid and reversible valence isomerization characterizes this unique composition of matter in the words of Doering and Roth as the molecule with the ideal "fluxional structure."

Hence, it would be expected that due to valence isomerization carbon atoms comprising the polycyclic ring and bearing substituents, would be in an ever changing relationship and thus the substituents would exist only momentarily as any one particular position isomer. Therefore, as hereinafter indicated, the mono-substituted and poly-substituted tricyclo[3.3.2.0$^{4,6}$]deca-2,7,9-trienes are not designated by any particular position isomer.

A preferred subclass of compositions within this first embodiment include, tricyclo[3.3.2.0$^{4,6}$]deca-2,7,9-trienes having one or more halogen atoms attached directly to the ring, e.g., compositions of the formula:

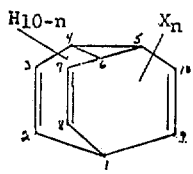

wherein X represents halogen, e.g., chlorine, bromine, iodine, or fluorine, and n has a value of from 1 to 2. Typical compositions include, among others, bromo-tricyclo[3.3.2.0$^{4,6}$] - deca - 2,7,9 - triene, chloro - tricyclo [3.3.2.0$^{4,6}$]deca-2,7,9-triene, iodo-tricyclo[3.3.2.0$^{4,6}$]deca-2,7,9 - triene, fluor o tricyclo-[3.3.2.0$^{4,6}$]deca-2,7,9-triene, dibromo - tricyclo[3.3.2.0$^{4,6}$]deca - 2,7,9-triene, dichloro-tricyclo[3.3.2.0$^{4,6}$]deca - 2,7,9 - triene, diiodo - tricyclo [3.3.2.0$^{4,6}$]deca-2,7,9-triene, difluoro-tricyclo[3.3.2.0$^{4,6}$] deca-2,7,9-triene, and the like. Also included are those halogenated polycyclic compounds wherein the ring contains a different substituent in addition to the halogen atom, such as amino-bromo-tricyclo[3.3.2.0$^{4,6}$]deca-2,7,9-triene, amino-iodo-tricyclo[3.3.2.0$^{4,6}$]deca-2,7,9-triene, ethoxy-iodo-tricyclo[3.3.2.0$^{4,6}$]deca-2,7,9-triene, tertiary-butoxy-iodo-tricyclo[3.3.2.0$^{4,6}$]deca-2,7,9-triene, and the like.

Preparation of the mono-halogenated polycyclic compositions of this subclass is effected, as set forth in the examples, by halogenation of tricyclo[3.3.2.0$^{4,6}$]deca-2,7,9-triene (I) to the 2,6-dihalo-bicyclo[3.3.2]deca-3,7,9-triene, (II) and thereafter removing one of the halogens as HX by means of potassium tertiary butylate to re-establish the tricyclo[3.3.2.0$^{4,6}$]deca-2,7,9-triene structure (III):

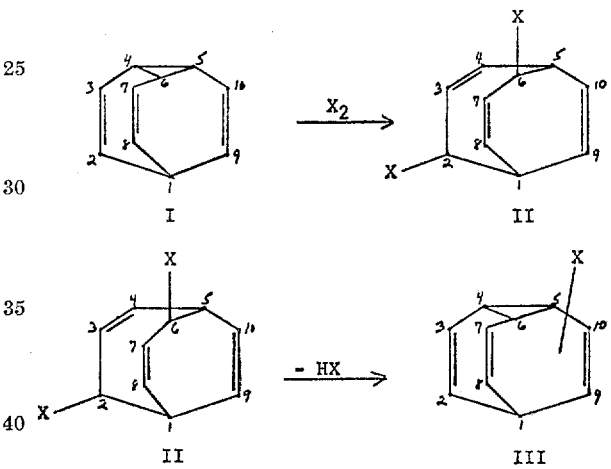

Once the monohalo-tricyclo[3.3.2.0$^{4,6}$]deca-2,7,9-triene is formed, and due to the Cope rearrangement, all possible position isomers will occur. In case it is desired to prepare a polyhalogenated tricyclo[3,3,2,0$^{4,6}$]deca-2,7,9-triene, for example, a dihalo[3.3.2.0$^{4,6}$]deca-2,7,9-triene, the aforesaid monohalo dicyclo[3.3.2.0$^{4,6}$]deca-2,7,9-triene(III), is further halogenated across the 9,10-olefinic double bond and one of the halogens removed as previously indicated.

Although there are ten carbon atoms comprising the ring structure, due to the symmetry of the molecule, only four position isomers are possible for the mono-halogenated compounds. When dihalo-tricyclo[3.3.2.0$^{4,6}$]deca-2,7,9-trienes are prepared, wherein both halogens are the same, the possibility exists for twelve isomers. When the halogens are different, twenty-one isomers are possible.

A further subclass of novel compositions within this first embodiment of the present invention encompasses the ethers of the tricyclo[3.3.2.0$^{2,6}$]deca-2,7,9-trienes:

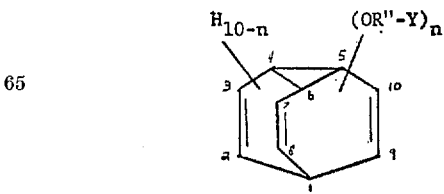

wherein R" represents a divalent alkylene group of from 1 to 12 carbon atoms; Y represents hydrogen, amino, alkylamino or dialkylamino; and n has a value of from 1 to 2. Typical compositions within this subclass include methoxy - tricyclo[3.3.2.0$^{4,6}$]deca-2,7,9-triene, ethoxy-tricyclo[3.3.2.0⁴,⁶]deca - 2,7,9 - triene, propoxy - tricyclo [3.3.2.0⁴,⁶]deca - 2,7,9 - triene, isopropoxy - tricyclo- [3.3.2.0⁴,⁶]deca-2,7,9-triene, butoxy-tricyclo[3.3.2.0⁴,⁶] deca-2,7,9-triene, tertiary-butoxy-tricyclo[3.3.2.0⁴,⁶]deca- 2,7,9 - triene, 2 - (N - dimethylamino)ethoxy - tricyclo [3.3.2.0⁴,⁶]deca-2,7,9 triene, 3-(N-dimethylamino)pro- poxy-tricyclo[3.3.2.0⁴,⁶]deca-2,7,9-triene, and the like. As in the aforesaid subclass due to the presence of the basic polycyclic ring structure, the Cope rearrangement does occur, as verified by temperature dependent nuclear magnetic resonance studies, and all of the possible position isomers are formed over a period of time.

Like the monohalo - tricyclo[3.3.2.0⁴,⁶]deca - 2,7,9- trienes, the ethers are conveniently formed from the 2,6- dihalo-bicyclo[3.3.2]deca-3,7,9-trienes (II). The dihalo compound, such as 2,6-dibromo-bicyclo[3.3.2]deca-3,7,9- trienes is dissolved in a suitable solvent, such as benzene, and the solution gradually added to a slurry of potassium tertiary-butylate in refluxing petroleum ether. Upon completion of the reaction, the ether is recovered and purified by conventional techniques.

Another subclass within the aforesaid first embodiment includes substituted tricyclo[3.3.2.0⁴,⁶]deca-2,7,9-trienes wherein R of the aforesaid general formula represents a hydrocarbon group, such as alkyl of from 1 to 12 carbon atoms and more preferably from 1 to 4 carbon atoms. These novel compositions can be represented by the formula:

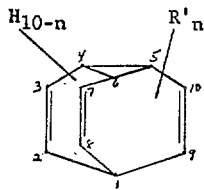

wherein R' represents the aforesaid hydrocarbon group and $n$ has a value of from 1 to 10 more preferably 1 to 4, and still more preferably 1 to 2.

Illustrative novel compositions within this subclass include, among others, methyl-tricyclo[3.3.2.0⁴,⁶]deca-2,7, 9-triene, ethyl-tricyclo[3.3.2.0⁴,⁶]deca-2,7,9-triene, propyl- tricyclo[3.3.2.0⁴,⁶]deca - 2,7,9-triene, isopropyl-tricyclo[3. 3.2.0⁴,⁶]deca-2,7,9-triene, butyl-tricyclo[3.3.2.0⁴,⁶]deca-2, 7,9 - triene, secondary-butyl-tricyclo[3.3.2.0⁴,⁶]deca-2,7,9- triene, tertiary - butyl-tricyclo[3.3.2.0⁴,⁶]deca-2,7,9-triene, pentyl - tricyclo[3.3.2.0⁴,⁶]-deca-2,7,9-triene, allyl-tricyclo [3.3.2.0⁴,⁶]deca - 2,7,9-triene, dimethyl-tricyclo[3.3.2.0⁴,⁶] deca-2,7,9-triene, methyl-ethyl-tricyclo[3.3.2.0⁴,⁶]deca-2,7, 9 - triene, diethyl-tricyclo[3.3.2.0⁴,⁶]deca-2,7,9-triene, and the like.

In general, the novel compositions within this subclass can be prepared by one or more convenient routes. For instance, one can start with the mono-halo-tricyclo [3.3.2.0⁴,⁶]deca-2,7,9-triene contained in a suitable hydrocarbon solvent, such as, for example, cyclohexane, pentane, tetrahydrofuran, and the like, and gradually add this solution at temperatures of from about 25°–50° C., to alkyllithium dissolved in suitable solvent and having the same number of carbon atoms as in the desired ring substituent. After maintaining at the aforesaid temperature for several hours, water is added to the mixture, the organic layer separated, and the alkyl-substituted compound recovered and purified by conventional techniques.

Alternatively, a halogenated tricyclo[3.3.2.0⁴,⁶]deca-2, 7,9-triene can be dissolved in solvent, for example cyclohexane, and metallic lithium or sodium added to form the metal-substituted polycyclic compound. Thereafter, an alkyl halide, such as methyl iodide or methyl bromide, is added in solution and the mixture worked up, organic layer isolated, and the product recovered as above.

Still another subclass within the first embodiment of this invention, are those compositions represented by the formula:

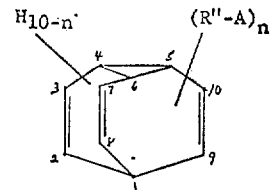

wherein R'' represents a divalent alkylene group containing from 1 to 10 carbon atoms, and more preferably 2 to 4 carbon atoms; A represents —OH, X, NH₂, NHR', NR'₂, or NCO, wherein X and R' have the same values previously indicated; and $n$ has a value of from 1 to 10, preferably 1 to 4, and more preferably 1 to 2.

Examples of compounds within this subclass include, the hydroxyalkyl-tricyclo[3.3.2.0⁴,⁶]deca-2,7,9-trienes, e.g., hydroxyethyl - tricyclo[3.3.2.0⁴,⁶]deca - 2,7,9 - triene, hydroxypropyl-tricyclo[3.3.2.0⁴,⁶]deca-2,7,9-triene, hydroxybutyl-tricyclo[3.3.2.0⁴,⁶]deca-2,7,9-triene, and the like; the haloalkyl-tricyclo[3.3.2.0⁴,⁶]deca-2,7,9-trienes e.g., chloroethyl - tricyclo[3.3.2.0⁴,⁶]deca - 2,7,9-triene, bromoethyl- tricyclo[3.3.2.0⁴,⁶]deca - 2,7,9 - triene, iodoethyl-tricyclo [3.3.2.0⁴,⁶]deca - 2,7,9 - triene, fluoroethyl-tricyclo[3.3.2. 0⁴,⁶]deca - 2,7,9 - triene, chloropropyl-tricyclo[3.3.2.0⁴,⁶] deca - 2,7,9-triene, bromopropyl-tricyclo[3.3.2.0⁴,⁶]deca-2, 7,9-triene, iodopropyl-tricyclo[3.3.2.0⁴,⁶]deca-2,7,9-triene, dichloroethyl - tricyclo[3.3.2.0⁴,⁶]deca - 2,7,9 - triene, dibromo - ethyl-tricyclo[3.3.2.0⁴,⁶]deca-2,7,9-triene, and the like; the aminoalkyl-tricyclo[3.3.2.0⁴,⁶]deca-2,7,9-trienes, e.g., aminoethyl - tricyclo[3.3.2.0⁴,⁶]deca - 2,7,9 - triene, aminopropyl - tricyclo[3.3.2.0⁴,⁶]deca-2,7,9-triene, aminobutyl - tricyclo[3.3.2.0⁴,⁶]deca - 2,7,9-triene, methylaminoethyl-tricyclo[3.3.2.0⁴,⁶]deca-2,7,9-triene, dimethylaminoethyl-tricyclo[3.3.2.0⁴,]deca-2,7,9-triene, and the like; the isocyanatoethyl-tricyclo[3.3.2.0⁴,⁶]deca-2,7,9-trienes, e.g., isocyanatoethyl - tricyclo[3.3.2.0⁴,⁶]deca-2,7,9-triene, and the like.

As in the previous subclass, these novel compositions can also be conveniently prepared from the halo-substituted tricyclo]3.3.2.0⁴,⁶]deca-2,7,9-trienes, that is from those compositions containing the halogen atoms(s) attached directly to the ring. Treatment in solvent with sodium or lithium, to replace the halogen(s) with the metal, and then by bubbling through an alkylene oxide, such as ethylene oxide, followed by addition of water, separation and recovery affords good yields of the hydroxyalkyl-substituted tricyclo[3.3.2.0⁴,⁶]deca-2,7,9-triene. The haloalkyl substituted compositions are thereafter conveniently formed by treating the hydroxyalkyl substituent with thionyl chloride, phosphorous trichloride, and the like, according to known techniques. By further reacting the resulting haloalkyl derivative with, for example, sodium or potassium amide in liquid ammonia the aminoalkyl-substituted compound is obtained. Conventional phosgenation of the aminoalkyl compounds gives the corresponding isocyanatoalkyl-tricyclo[3.3.2.0⁴,⁶]deca-2,7,9-triene.

A further subclass within this first embodiment includes the tricyclo[3.3.2.0⁴,⁶]deca-2,7,9-trienes of the formula:

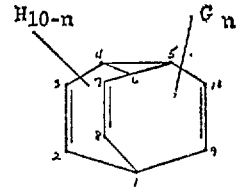

wherein G represents NH₂, NHR', NR'₂ or NCO and $n$ has the same value as previously indicated.

Within this subclass are such novel compositions as amino - tricyclo[3.3.2.0$^{4,6}$]deca - 2,7,9-triene, diamino-tricyclo[3.3.2.0$^{4,6}$]deca - 2,7,9 - triene, methylamino-tricyclo [3.3.2.0$^{4,6}$]deca-2,7,9-triene, dimethylamino - tricyclo[3.3.2.0$^{4,6}$]deca-2,7,9-triene, diethylamino - tricyclo[3.3.2.0$^{4,6}$]deca-2,7,9-triene, isocyanato-tricyclo[3.3.2.0$^{4,}$]deca-2,7,9-triene, diisocyanato - tricyclo[3.3.2.0$^{4,6}$]deca-2,7,9-triene, and the like.

These novel compositions are prepared by reacting the halo-substituted tricyclo[3.3.2.0$^{4,6}$]deca-2,7,9-trienes, hereinbefore disclosed, with potassium or sodium amide, and thereafter phosgenation of the amine to the isocyanate. For instance, metallic sodium or potassium is first dissolved in liquid ammonia containing ferric salts, such as ferric acetate, and the halogenated polycyclic compound gradually added. After the reaction is complete ammonia is distilled off, water added, the reaction product taken up in suitable solvent such as benzene, and the amine separated and purified by known procedures. Subsequent phosgenation of the amine provides the corresponding isocyanate.

A final subclass within this first embodiment of compositions which exhibits fast and reversible valence isomerization are those of the following formula:

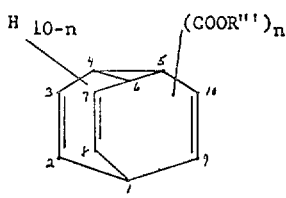

wherein R''' represents hydrogen or a hydrocarbon group, such as alkyl of from 1 to 12 carbon atoms, more preferable 1 to 4 carbon atoms; and $n$ has the same value as previously indicated.

Typical compositions include, among others, the mono- and poly-substituted carboxylic acids, e.g., tricyclo[3.3.2.0$^{4,6}$]deca-2,7,9-triene carboxylic acid, tricyclo[3.3.2.0$^{4,6}$]deca,2,7,9-triene dicarboxylic acid; the mono- and poly-substituted esters of tricyclo[3.3.2.0$^{4,6}$]deca-2,7,9-triene, e.g., methyl tricyclo[3.3.2.0$^{4,6}$]deca-2,7,9-triene carboxylate, propyl tricyclo[3.3.2.0$^{4,6}$]deca-2,7,9-triene carboxylate, butyl tricyclo[3.3.2.0$^{4,6}$]deca-2,7,9-triene carboxylate, allyl tricyclo[3.3.2.0$^{4,6}$]deca-2,7,9-triene carboxylate, dimethyl tricyclo[3.3.2.0$^{4,6}$]deca-2,7,9-triene dicarboxylate, dipropyl tricyclo[3.3.2.0$^{4,6}$]deca-2,7,9-triene dicarboxylate, diallyl tricyclo[3.3.2.0$^{4,6}$]deca-2,7,9-triene dicarboxylate, and the like.

The acids and esters of this subclass can also be prepared from the tricyclo[3,3,2,0$^{4,6}$]deca-2,7,9-trienes having one or more halogens attached directly to the ring. For instance, the halogenated composition is dissolved in a suitable solvent such as cyclohexane, pentane, hexane or the like, and metallic lithium or sodium added as in the previous methods. Thereafter the polycyclic organolithium or sodium compound is placed in an autoclave and treated with carbon dioxide at a pressure of at least several atmospheres. Recovery and purification of the acid is then effected by conventional techniques. Esterification with saturated or unsaturated alcohols by conventional methods, affords high yields of the corresponding esters.

It should be noted that while the aforesaid subclasses have been directed, for the most part, to particular substituents the various compositions encompassed by the first embodiment, can also contain other substituents. For example, the invention is intended to encompass the dihalotricyclo[3.3.2.0$^{4,6}$]deca-2,7,9-trienes wherein one halogen is attached directly to the ring and the other attached to the ring through an alkylene group. For instance, bromobromoethyl - tricyclo[3.3.2.0$^{4,6}$]deca-2,7,9-triene. Various other combinations will be readily apparent to those skilled in the art in view of the aforesaid discussion.

As hereinbefore indicated, the starting material for the preparation of the majority of the compositions of this invention is tricyclo[3.3.2.0$^{4,6}$]deca-2,7,9-triene of the formula:

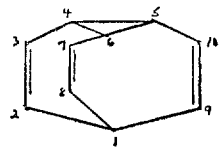

This composition is a high melting compound which is thermally stable at temperatures as high as 350° C. However, at temperatures above 400° C. it decomposes to provide a relatively pure form of naphthalene. Moreover, the polycyclic composition, like naphthalene, also undergoes a gradual sublimation at room temperature.

Recently, a process has been discovered which provides an efficient and economically attractive route to the tricyclo[3.3.2.0$^{4,6}$]deca-2,7,9-triene itself. This process has made possible the preparation of heretofore unknown compositions having a variety of useful and unexpected properties.

In general, tricyclo[3.3.2.0$^{4,6}$]deca-2,7,9-triene can be prepared by a two-step process involving the dimerization of cyclooctatetraene and subsequent cleavage of the dimer to the polycyclic triene. In the first step of the instant novel process dimeric cyclooctatetraene (V) is formed from cyclooctatetraene (IV) in accordance with the following equation:

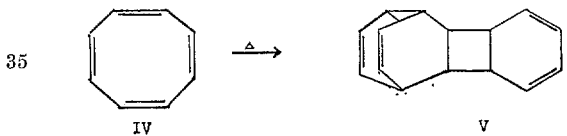

thereafter, the dimeric product is cleaved across the cyclobutyl nucleus by exposure to radiation to give tricyclo[3.3.2.0$^{4,6}$]deca-2,7,9-triene (VI) and benzene.

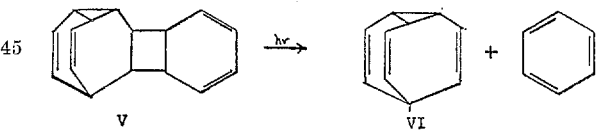

Infrared and nuclear magnetic resonance analysis of both the dimer and tricyclo[3.3.2.0$^{4,6}$]deca-2,7,9-triene verified that the compositions had the assigned structure.

Dimerization of cyclooctatetraene is most conveniently effected by merely heating the composition to temperatures up to about 125° C. for a period of time sufficient to form optimum yields of the dimer. Temperatures above 125° C., while operable, are less preferred due to the further dimerization which result in tetramers and higher molecular weight products. Although cyclooctatetraene slowly dimerizes at room temperature, for economic considerations temperatures of from 25° to 125° C., and more preferable 90° to 110° C. are employed. In practice, it has been found that optimum yields of the dimer are obtained when heating is effected at 100° C. over a period of about 70 hours. However, temperatures and periods above and below the aforesaid ranges can equally as well be employed but are less preferred.

While the dimerization step can be conducted in air, it is preferred to operate under an inert atmosphere such as nitrogen, argon and the like.

Separation of unreacted cyclooctatetraene from the dimer can be conveniently effected by distillation at reduced pressures. Thereafter the dimeric cyclooctatetraene can be purified by recrystallization from suitable solvents such as ethanol, and the like.

Cleavage of the cyclobutyl nucleus of the dimeric cyclooctatetraene to form tricyclo[3.3.2.0$^{4,6}$]deca-2,7,9-triene and benzene as a by-product is conveniently effected by exposing the dimer to a radiation source having wavelengths shorter than 7000 angstroms such as X-rays, ultraviolet light, and the like. It is particularly desirable to utilize radiation in wavelengths of from about 0.005 angstroms to about 4500 angstroms and most preferable from about 2000 to about 4000 angstroms. In practical operation of the instant novel process, optimum results are obtained within the aforesaid most preferred range.

By the term "radiation" as employed throughout the specification and appended claims, is meant electromagnetic radiation, such as for example, X-rays, gamma rays and the like, or particulate radiation such as alpha, beta, and similar radiation.

The radiation which is sufficient to cleave the cyclobutyl nucleus can be achieved by the use of a gamma radiation source, such as cobalt 60, a Van de Graff generator, and the like; an X-ray source such as a vacuum tube; an ultraviolet light source such as xenon lamp, mercury arc, and the like; a near ultraviolet source such as argon arc, mercury arc, xenon lamp and the like; a visible light source such as sunlight, sunlamp, tungsten bulb, carbon arc, a laser, a nitrogen plasma arc, an oxygen induction coil and the like. Additionally, the radiation source can be an electromagnetic propagating source.

Conditions of exposure of the dimeric cyclooctatetraene to the energy source, will of course vary depending upon the particular radiation employed. Additionally, the vessel or use of any solvents with the dimeric composition will influence the optimum exposure conditions. In practice, it has been found that the optimum yield of tricyclo[3.3.2.0$^{4,6}$]deca-2,7,9-triene is obtained by exposure of the dimer contained in an inert solvent to an ultraviolet light source.

The cleavage of the dimerized cyclooctatetraene is preferably conducted in a solvent in which the reactants are at least partially soluble and which is inert to the cyclooctatetraene and the polycyclic hydrocarbon product obtained therefrom. When the energy source employed to cleave the cyclobutyl nucleus is ultraviolet irradiation it is also preferred, from economic considerations, that the solvent itself does not absorb or screen the energy from the dimer. The solvent chosen should preferably be one capable of dissolving the dimer and from which tricyclo-[3.3.2.0$^{4,6}$]deca-2,7,9-triene can be easily recovered by known techniques, such as crystallization distillation and the like. Suitable solvents which can be employed in the practice of this invention include organic solvents such as, aliphatic hydrocarbons such as pentanes, hexanes, heptanes, and the like; ethers for example, diethyl ether, dibutyl ether, and the like; ketones, such as acetone, methyl ethyl ketone, and the like; cycloaliphatic hydrocarbons such as cyclohexane, cycloheptane and the like.

The period of exposure as well as the degree the radiation is easily determined by routine experimentation for each particular energy source. For instance, it has been found that when a solvent such as diethyl ether is employed, and ultraviolet radiation is the energy source, yields as high as 80 percent and higher are obtained after exposure of 24 hours.

While each of the novel compositions of the first embodiment of this invention are characterized by fast and reversible valence isomerization, the compounds of the remaining embodiments do not exhibit this unique property either because of the absence of one or more double bonds or the absence of the cyclopropyl group, i.e., the absence of a bond at the 4,6-position of the tricyclo-[3.3.2.0$^{4,6}$]deca-2,7,9-triene ring structure.

For example, due to the absence of the cyclopropyl group, the dihalo-bicyclo[3.3.2]deca-3,7,9-trienes, hereinbefore discussed are not characterized by valence isomerization, but do form an important embodiment of the present invention. These compositions can be represented by the formula:

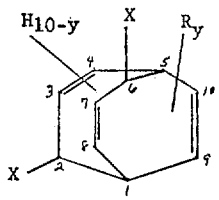

wherein X represents halogen, i.e., chlorine, fluorine, bromine or iodine; R has the same value as previously indicated, and y has a value of from 0 to 8, more preferably 0 to 4, and still more preferably 0 to 2. Typical compositions within this embodiment include 2,6-dibromo-bicyclo[3.3.2]deca-3,7,9-triene, 2,6-diiodo-bicyclo[3.3.2]deca-3,7,9-triene, 2,6 - dichloro - bicyclo[3.3.2]deca-3,7,9-triene, 2,6-difluoro - bicyclo[3.3.2]deca-3,7,9 - triene, 2,6-dibromo-7-methyl-bicyclo[3.3.2]deca-3,7,9-triene, 2,6-di-iodo - 7 - propyl - bicyclo[3.3.2]deca-3,7,9-triene, and the like. These novel compositions are prepared in the manner hereinbefore indicated under the first embodiment of this invention.

Novel compositions also within the scope of this invention include the saturated tricyclo[3.3.2.0$^{4,6}$]decanes obtained from the unsaturated compounds of the previous first embodiment. These novel compositions can be represented by the formula:

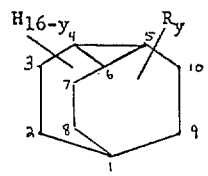

wherein R and y have the same value as previously indicated.

Illustrative compositions within this embodiment include among others, tricyclo[3.3.2.0$^{4,6}$]decane; the alkyl-substituted tricyclo[3.3.2.0$^{4,6}$]decanes, e.g., 7-methyl-tricyclo[3.3.2.0$^{4,6}$]decane, 8-propyl-tricyclo[3.3.2.0$^{4,6}$]decane, and the like; the halogenated tricyclo[3.3.2.0$^{4,6}$]decanes, e.g., 7-bromo-tricyclo[3.3.2.0$^{4,6}$]decane, 8-bromo-tricyclo[3.3.2.0$^{4,6}$]decane, 7-chloro-tricyclo[3.3.2.0$^{4,6}$]decane, 7-iodo - tricyclo[3.3.2.0$^{4,6}$]decane, 8 - fluoro - tricyclo [3.3.2.0$^{4,6}$]decane, and the like; the haloalkyl-substituted tricyclo[3.3.2.0$^{4,6}$]decanes, e.g., 7-trichloroethyl-tricyclo [3.3.2.0$^{4,6}$]decane, and the like; the alkoxy-substituted-tricyclo[3.3.2.0$^{4,6}$]decanes, e.g., 8 - methoxy - tricyclo [3.3.2.0$^{4,6}$]decane, 7-tertiary-butoxy tricyclo[3.3.2.0$^{4,6}$] decane, 8-hexoxy-tricyclo[3.3.2.0$^{4,6}$]decane, and the like; the ester substituted tricyclo[3.3.2.0$^{4,6}$]decanes, e.g., 7-methoxycarbonyl-tricyclo]3.3.2.0$^{4,6}$]decane, 8-butoxycarbonyl-tricyclo[3.3.2.0$^{4,6}$]decane, and the like; the amino-substituted tricyclo[3.3.2.0$^{4,6}$]decanes, e.g., 7-amino-tricyclo[3.3.2.0$^{4,6}$]decane, 8 - amino-tricyclo[3.3.2.0$^{4,6}$]decane, 7-diethylamino-tricyclo[3.3.2.0$^{4,6}$]decane, and the like; the isocyanato-substituted tricyclo[3.3.2.0$^{4,6}$]decane, and the like.

The saturated polycyclic compositions of this invention are conveniently prepared from the corresponding unsaturated tricyclo[3.3.2.0$^{4,6}$]deca-2,7,9-triene compounds of the first embodiment of this invention. In practice, the unsaturated polycyclic compound, for example, tricyclo [3.3.2.0$^{4,6}$]deca-2,7,9-triene, is first dissolved in a suitable solvent, such as methanol. To this solution are added water, copper (II) acetate, and a certain quantity of hydrazine. While the solution is maintained at about room temperature by external cooling, oxygen is bubbled through over a period of ten hours. Thereafter, the saturated tricyclic compound is extracted from the reaction mixture with pentane and recovered by conventional techniques, such as, recrystallization.

A further embodiment of this invention is directed to a novel composition which is a derivative of the starting material employed in the preparation of tricyclo[3.3.2.0⁴,⁶]deca - 2,7,9- - triene itself. As indicated previously, tricyclo[3.3.2.0⁴,⁶]deca-2,7,9-triene is obtained by cleavage of the cyclooctatetraene dimer, benzene being obtained as a by-product. It has been found that the dimer undergoes a Diels-Alder reaction with acetylenedicarboxylic ester to give a composition which upon heating at about 160° C. decomposes into dimethylphthalate and tetracyclo[5.3.2.0²,⁵0⁶,⁸]dodeca-3,9,11-triene having the formula:

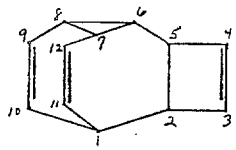

This composition is conveniently prepared by adding to the dimeric cyclooctatetraene (pentacyclo[9.3.2.0²,⁹0³,⁸0¹⁰,¹²] hexadeca-4,6,13,15-tetraene) dissolved in benzene, freshly distilled acetylenedicarboxylic acid dimethyl ester. After completion of the reaction and recovery of the product, the adduct is heated to about 160° C. whereupon it decomposes into the dimethyl phthalate and the aforesaid novel composition.

Although the novel composition of this embodiment is composed solely of carbon and hydrogen, it is a particularly attractive molecule and is useful in the praparation of epoxides, polymers, copolymers, and the like. Moreover, various functional groups can be added across one or more of the double bonds to provide new and useful compositions.

A further embodiment of this invention encompasses other novel compositions also containing three olefinic double bonds but without the cyclopropyl group. These novel compositions are also derived from the tricyclo [3.3.2.0⁴,⁶]deca - 2,7,9 - trienes of the first embodiment and can be represented by the formula:

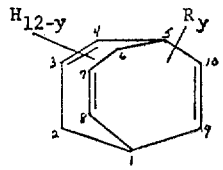

wherein R and Y have the same value as previously indicated. Illustrative compositions within this embodiment include, among others, bicyclo[3.3.2]deca-3,7,9-triene; the alkylsubstituted bicyclo[3.3.2]deca-3,7,9-trienes, e.g., 7-methyl-bicyclo[3.3.2]deca-3,7,9-triene, 8-propyl-bicyclo[3.3.2]deca-3,7,9-triene, 7-pentyl-bicyclo[3.3.2]deca - 3,7,-9-triene, and the like; the halogenated bicyclo[3.3.2]deca-3,7,9-trienes, e.g., 7-chloro-bicyclo[3,3.2]deca-3,7,9-triene, 7-bromo-bicyclo[3.3.2]deca-3,7,9-triene, 8 - iodo - bicyclo [3.3.2]deca-3,7,9-triene, 7-iodo-bicyclo[3.3.2]deca - 3,7,9-triene; and the like; the haloalkyl-substituted bicyclo[3.3.2] deca-3,7,9-trienes, e.g., 8 - trichloromethyl-bicyclo[3.3.2] deca-3,7,9-triene, and the like; the alkoxy-substituted bicyclo[3.3.2]deca-3,7,9-trienes, e.g., 7 - methoxy-bicyclo [3.3.2]deca-3,7,9-triene, 8-tertiary-butoxy - bicyclo[3.3.2] deca-3,7,9-triene, 7-propoxy-bicyclo[3.3.2]deca-3,7,9-triene, and the like; the ester-substituted bicyclo[3.3.2]deca-3,7,9-trienes, e.g., 8-methoxycarbonyl-bicyclo[3.3.2]deca-3,7,9-triene, 7-butoxy-carbonyl-bicyclo[3.3.2]deca-3,7,9-triene, and the like; the amino-substituted bicyclo[3.3.2] deca-3,7,9-trienes, e.g., 8-amino-bicyclo[3.3.2]deca-3,7,9-triene, 7-amino-bicyclo[3.3.2]deca-3,7,9-triene, 8-dimethylamino-bicyclo[3.3.2]deca - 3,7,9 - triene, and the like; the isocyanato-substituted bicyclo[3.3.2]deca-3,7,9-trienes, e.g., 7-isocyanato bicyclo[3.3.2]deca-3,7,9-triene, and the like.

In practice, the novel bicyclo[3.3.2]deca-3,7,9-trienes of this embodiment are prepared by the treatment of the corresponding tricyclo[3.3.2.0⁴,⁶]deca-2,7,9 - triene compound with sodium in liquid ammonia at about −75° C. and subsequent decomposition with methanol.

For instance, sodium is dissolved at −75° C. in water-free ammonia and the tricyclo[3.3.2.0⁴,⁶]deca-2,7,9-triene dissolved in tetrahydrofuran gradually added while the mixture is stirred. After about 10 minutes the mixture is decomposed at −75° C. with a methanol/pentane solution. Thereafter, ammonia is distilled, water added and the organic layer separated. Recovery of the bicyclo [3.3.2]deca-3,7,9-triene compound can then be effected by conventional techniques.

Due to the bicyclic ring structure and the polyunsaturation, the compositions of this embodiment are useful in many of the same applications as those of the previous first embodiment. Bicyclo[3.3.2]deca-3,7,9-triene itself, while containing no functional groups, can undergo various reactions to provide useful compositions.

A further aspect of the present invention relates to novel polyhalo-polycyclic compounds which can be represented by the following formula:

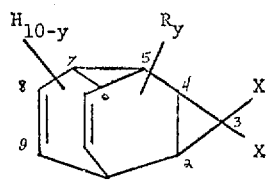

wherein R and X have the same value as previously indicated and y has a value of from 0 to 10, and more preferable from 0 to 3. Preferred compositions are those wherein R represents a lower alkyl group. Particularly preferred compositions are those wherein y is zero, i.e., the unsubstituted dihalo compounds.

Illustrative compositions within this embodiment include among others, the 3,3-dihalo-tetracyclo[4.3.2.0²,⁴0⁵,⁷] undeca - 8,10 - diene, e.g., 3,3 - dichloro - tetracyclo [4.3.2.0²,⁴0⁵,⁷]undeca-8,10-diene, 3,3-dibromo - tetracyclo [4.3.2.0²,⁴0⁵,⁷]undeca-8,10-diene, and the like; the alkyl-substituted 3,3 - dihalo - tetracyclo[4.3.2.0²,⁴0⁵,⁷]undeca-8,10 - diene, e.g., 8 - methyl 3,3 - dichloro - tetracyclo [4.3.2.0²,⁴0⁵,⁷]undeca - 8,10 - diene, 8 - butyl - 3,3 - dichloro - tetracyclo[4.3.2.0²,⁴0⁵,⁷]undeca - 8,10 - diene, and the like; the trihalo - tetracyclo[4.3.2.0²,⁴0⁵,⁷]undeca - 8,10 - diene, e.g., 9 - chloro - 3,3 - dichloro - tetracyclo[4.3.2.0²,⁴0⁵,⁷]undeca - 8,10 - diene; 8 - bromo - 3,3-dibromo - tetracyclo[4.3.2.0²,⁴0⁵,⁷]undeca - 8,10 - diene, and the like; the haloalkyl - substituted - 3,3 - dihalo-tetracyclo[4.3.2.0²,⁴0⁵,⁷]undeca - 8,10 - diene, e.g., 9-chloroethyl - 3,3 - dichloro - tetracyclo[4.3.2.0⁵,⁷]undeca-8,10 - diene, 8 - trichloromethyl - 3,3 - dichloro - tetracyclo[4.3.2.0²,⁴0⁵,⁷]undeca - 8,10 - diene, and the like; the alkoxy - substituted 3,3 - dihalo - tetracyclo[4.3.2.0²,⁴0⁵,⁷] undeca - 8,10 - diene, e.g., 8 - methoxy - 3,3 - dichloro-tetracyclo[4.3.2.0²,⁴0⁵,⁷]undeca - 8,10 - diene, 9-tertiary-butoxy - 3,3-dibromo-tetracyclo[4.3.2.0²,⁴0⁵,⁷]undeca - 8, 10-diene, and the like; the ester substituted 3,3-dihalo-tetracyclo[4.3.2.0²,⁴0⁵,⁷]undeca-8,10-diene, e.g., 9-methoxycarbonyl - 3,3 - dichloro - tetracyclo[4.3.2.0²,⁴0⁵,⁷]undeca-8,10-diene, and the like; the amino substituted 3,3-dihalo-tetracyclo[4.3.2.0²,⁴0⁵,⁷]undeca - 8,10-diene, e.g., 9-amino-3,3-dichloro-tetracyclo[4.3.2.0²,⁴0⁵,⁷]undeca - 8,10-diene, 8 - dimethylamino - 3,3-dichloro-tetracyclo[4.3.2.0²,⁴0⁵,⁷] undeca-8,10-diene, and the like.

In the preparation of the novel polyhalo-polycyclic compounds of this embodiment, the tricyclo[3.3.2.0⁴,⁶]

deca-2,7,9-trienes are reacted with dihalocarbene according to the equation:

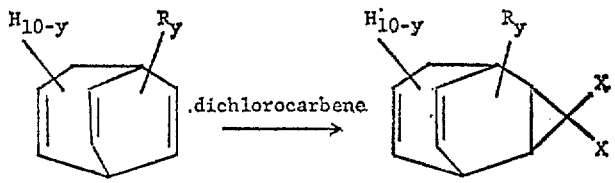

wherein R, X and y have the same value as previously indicated. The dihalocarbene, such as dichlorocarbene is conveniently prepared by the method of W. von E. Doering and A. K. Hoffmann, J. Am. Chem. Soc. 76, 6162 (1954).

In general, the conversion of the tricyclo[3.3.2.0$^{4,6}$]deca-2,7,9-triene to the dihalo derivative is effected by the gradual addition of the polycyclic compound contained in a suitable solvent, such as pentane, to potassium tertiarybutylate at 0° C. Thereafter chloroform in suitable solvent, is added dropwise to the well stirred suspension. Thereafter, the reaction mixture is heated to about 40° C. for 30 minutes and decomposed with water. The water layer separated, the organic layer washed three times with water and dried. The solvent is then distilled off and the white residue fractionally sublimed and the dichlorocarbene adduct recovered.

Due to the presence of the two halogen groups in the 3-position as well as the unsaturated groups in the 8,9- and 10,11- positions, the novel compositions of this embodiment of the invention have been found useful in a variety of applications. For example, 3,3-dichloro-tetracyclo[4.3.2.0$^{2,4}$0$^{5,7}$]undeca-8,10-diene has been found useful not only as a chemical intermediate in the preparation of numerous compositions, but in electrical insulation applications, hydraulic mediums, lubricants for use at various temperatures, and also as constituents of adhesives, plastics, lacquers, paints and varnishes.

In another aspect, the present invention encompasses polycyclic polyols which can be represented by the formula:

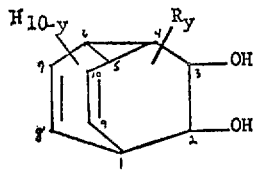

wherein R has the same value as previously indicated and y has a value of from 0 to 10, and more preferably 0 to 3. Preferred compositions are those wherein R represents halogen or lower alkoxy. Particularly preferred compositions are those wherein y is zero, i.e., the unsubstituted diols.

Illustrative compositions within this embodiment include, among others, 2,3-dihydroxy-tricyclo[3.3.2.0$^{4,6}$]deca-7,9-diene;
the alkyl-substituted 2,3-dihydroxy-tricyclo[3.3.2.0$^{4,6}$] deca-7,9-diene, e.g.,
7-methyl-2,3-dihydroxy-tricyclo[3.3.2.0$^{4,6}$]deca-7,9-diene,
8-propyl-dihydroxy-tricyclo[3.3.2.0$^{4,6}$]deca-7,9-diene, and the like;
the halogenated 2,3-diyhdroxy-tricyclo[3.3.2.0$^{4,6}$]deca-7,9-diene, e.g.,
7-bromo-2,3-dihydroxy-tricyclo[3.3.2.0$^{4,6}$]deca-7,9-diene,
8-bromo-2,3-dihydroxy-tricyclo[3.3.2.0$^{4,6}$]deca-7,9-diene,
8-chloro-2,3-dihydroxy-tricyclo[3.3.2.0$^{4,6}$]deca-7,9-diene,
8-iodo-2,3-dihydroxy-tricyclo[3.3.2.0$^{4,6}$]deca-7,9-diene,
8-fluoro-2,3-dihydroxy-tricyclo[3.3.2.0$^{4,6}$]deca-7,9-diene, and the like;
the haloalkyl-substituted 2,3-dihydroxy-tricyclo-[3.3.2.0$^{4,6}$]deca-7,9-diene, e.g.,
7-trichloromethyl-2,3-dihydroxy-tricyclo[3.3.2.0$^{4,6}$]deca-7,9-diene, and the like;
the alkoxy-substituted-2,3-dihydroxy-tricyclo[3.3.2.0$^{4,6}$] deca-7,9-diene, e.g.,
8-methoxy-2,3-dihydroxy-tricyclo[3.3.2.0$^{4,6}$]deca-7,9-diene,
7-tertiary-butoxy-2,3-dihydroxy-tricyclo[3.3.2.0$^{4,6}$]deca-7,9-diene,
8-tertiary-butoxy-2,3-dihydroxy-tricyclo[3.3.2.0$^{4,6}$]deca-7,9-diene,
8-hexoxy-2,3-dihydroxy-tricyclo[3.3.2.0$^{4,6}$]deca-7,9-diene, and the like;
the ester substituted 2,3-dihydroxy-tricyclo[3.3.2.0$^{4,6}$] deca-7,9-diene, e.g.,
7-methoxycarbonyl-2,3-dihydroxy-tricyclo[3.3.2.0$^{4,6}$] deca-7,9-diene,
8-butoxycarbonyl-2,3-dihydroxy-tricyclo[3.3.2.0$^{4,6}$] deca-7,9-diene, and the like;
the amino-substituted 2,3-dihydroxy-tricyclo[3.3.2.0$^{4,6}$] deca-7,9-diene, e.g.,
7-amino-2,3-dihydroxy-tricyclo[3.3.2.0$^{4,6}$]deca-7,9-diene,
8-amino-2,3-dihydroxy-tricyclo[3.3.2.0$^{4,6}$]deca-7,9-diene,
7-dimethylamino-2,3-dihydroxy-tricyclo[3.3.2.0$^{4,6}$]deca-7,9-diene, and the like;
the isocyanato-substituted 2,3-dihydroxy-tricyclo [3.3.2.0$^{4,6}$]deca-7,9-diene, e.g.,
8-isocyanato-2,3-dihydroxy-tricyclo[3.3.2.0$^{4,6}$]deca-7,9-diene, and the like.

In practice, the compositions of this embodiment are conveniently prepared from the tricyclo[3.3.2.0$^{4,6}$]deca-2,7,9-trienes of the first embodiment of this invention in accordance with the following reaction:

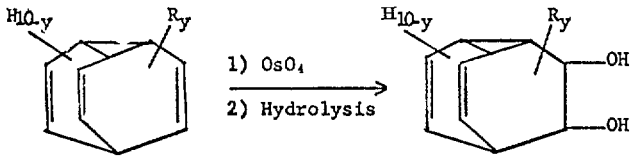

wherein R and y have the same value as previously indicated.

The addition of the two hydroxyl groups across the double bond in the 2,3-position is conveniently effected by the method of R. Criegee et al., Liebigs Ann. Chem. 550, 99(1942).

For example, the tricyclo[3.3.2.0$^{4,6}$]deca-2,7,9-triene starting material is dissolved in a suitable solvent such as ether, a small quantity of pyridine added, and the solution treated at 0° C. with osmium tetroxide contained in ether. The resulting precipitate is recovered, dried, dissolved in methylene chloride, and then decomposed with an aqueous solution containing potassium hydroxide, and mannitol. After shaking the reaction mixture, the methylene chloride solution is distilled and the crystalline residue fractionally sublimed to give the 2,3-dihydroxy-tricyclo [3.3.2.0$^{4,6}$]deca-7,9-diene compound.

In view of the fact that each of the novel compounds of this embodiment of the invention is characterized by the presence of at least two hydroxyl groups, they can be utilized in the preparation of a variety of useful reaction products. For example, glycols have found extensive use in the manufacture of synthetic fibers, alkyl resins, antifreeze and in the pharmaceutical and cosmetic fields. Polyols are also used extensively as freezing point depressants, brake fluids, solvents, plasticizers and the like.

One of the more promising fields for polyols, particularly those containing an active double bond is in the preparation of polyurethane elastomers. By employing an unsaturated diol as part of the basic polyurethane polymer network the resulting polymer may be conveniently vulcanized by the conventional methods used for curing rubber. The presence of the double bond permits the vulcanization, for example, by sulfur, peroxides and the like, thus, for example, a polymeric polyurethane can be prepared by reacting a polymeric glycol with an organic diisocyanate and the unsaturated polyol to obtain a polymer which can be cured with conventional curing agents. In general, with this method, the unsaturated polyol is used to the extent of about 1 to 10 percent by weight in the final polyurethane elastomer formulation and is vulcanized with about 0.5 to 10 parts by weight of sulfur or other curing agent per 100 parts of polymer. Curing at temperatures of about 125° C.–160° C. for from one-half to several hours is generally sufficient. Depending on the particularly polyurethane used, various modifications of the curing step may be employed.

As previously indicated, the novel compositions which are obtained by the practice of this invention are a useful class of compounds having significant and unobvious properties in various fields of application. Due to the unsaturated nature, certain of the novel compositions are particularly attractive for use as reactive polymerizable monomers. For example, the unsaturated compounds of this invention can be homopolymerized through the olefinic group, or copolymerized with other olefinically unsaturated organic compounds, e.g., vinyl monomers, through their olefinic groups, preferably in the presence of a peroxide catalyst to give linear solid polymeric products which have utility in the molding, laminating, and coating arts, e.g., manufacture of plastic toys which can be rigid or flexible, paperweights, inkstands, and the like.

Among the vinyl monomers which are contemplated are those which contain a polymerizable olefinic bond. Illustrative vinyl monomers include, for example, styrene, alkylstyrene, chlorostyrene, ethylstyrene, dimethylstyrene, isopropylstyrene, divinylbenzene, alkyl acrylate, alkyl methacrylate, alkyl crotonate, methyl acrylate, ethyl acrylate, n-propylacrylate, n-butyl acrylate, methyl methacrylate, ethyl methacrylate, isopropyl methacrylate, n-amyl methacrylate, methyl crotonate, ethyl crotonate, n-propyl crotonate, t-butyl crotonate, 2-ethylhexyl crotonate, vinyl acetate, vinyl propionate, vinyl butyrate, vinyl valerate, and the like. Additional desirable monomeric ethylenically unsaturated compounds include, for instance, triallyl cyanurate, diallyl phthalate, triallylamine, acrylonitrile, allyl acrylate, allyl methacrylate, allyl crotonate, allyl butyrate, allyl 2-ethylhexanoate, allyl benzoate, and the like.

The peroxide catalysts which can be employed include, for instance, benzoyl peroxide, methyl ethyl ketone peroxide, methyl isobutyl ketone peroxide, p-menthane hydroperoxide, t-butyl hydroperoxide, cumene hydroperoxide, acetyl peroxide, cyclohexanone peroxide, lauroyl peroxide, di-t-butyl peroxide, t-butyl perbenzoate, and the like.

The operative conditions, i.e., temperature and pressure are of the order employed in the vinyl-type polymerization arts, e.g., 75°–150° C.

Additionally, many of the unsaturated compositions of this invention can be contacted with an organic peracid to produce the corresponding vicinal-epoxides. Among the peracids contemplated include, for example, the aliphatic peracids, the cycloaliphatic peracids, the aromatic peracids, and the like. The organic hydrocarbon peracids are preferred. Illustrative peracids include, for instance, peracetic acid, perpropionic acid, perbutyric acid, perhexanoic acid, perdodecanoic acid, perbenzoic acid monoperphthalic acid, and the like. The lower aliphatic hydrocarbon peracids which contain from 2 to 4 carbon atoms are highly suitable. Peracetic acid is most preferred. It is highly desirable to employ the peracid as a solution in an inert normally liquid organic vehicle such as ethyl acetate, butyl acetate, acetone, and the like. A solution comprising from about 10 to 50 weight percent of peracid, based on the total weight of peracid and inert organic vehicle is suitable; from about 20 to 40 weight percent of the peracid is preferred. The epoxidation reaction can be conducted at a temperature in the range of from about 0° C., and lower to about 100° C., and higher, and preferably from about 20° C. to about 80° C. Substantial conversion of the monoethylenically unsaturated cyclic carbonate compound to the corresponding vicinal-epoxy cyclic carbonate compound is accomplished, by employing at least one mol of peracid per mol of said monoethylenically unsaturated cyclic carbonate, e.g., from about 1.0 to about 10 mols of peracid per mol of said carbonate. In general, the epoxidation reaction is conducted for a period of time which is sufficient to introduce oxirane oxygen at the site in the carbonate reactant. Oftentimes, this reaction period is usually sufficient to essentially consume the quantity of peracid employed. Periodic analysis of samples of the reaction mixture to determine the quantity of peracid consumed during the epoxidation reaction can be readily performed by the operator by well-known techniques. At the termination of the epoxidation reaction, the unreacted ethylenically unsaturated carbonate precursor, acid by-product, inert vehicle, if employed, and the like, can be recovered from the reaction product mixture, for example, by distillation under reduced pressure. Further well-known procedures such as fractional distillation, and the like, can be used to purify the vicinal-epoxy cyclic carbonate product.

The novel and useful vicinal-epoxy polycyclic compounds can be homopolymerized or copolymerized with other vicinal-epoxy cyclic carbonates or with other mono- or poly-epoxides, preferably in the presence of an epoxy polymerization catalyst such as the metal halide Lewis acids, e.g., boron trifluoride, under typical epoxy polymerization conditions, to give solid polymeric products which are useful as paperweights, in the manufacture of toys, etc.

Among the mono- and polyepoxides which are contemplated include, among others, 4-vinylcyclohexene dioxide, dicyclopentadiene dioxide, divinylbenzene dioxide, 3,4-epoxy-6-methylcyclo hexylmethyl 3,4-epoxy-6-methyl-cyclohexanecarboxylate, diethylene glycol bis(3,4-epoxy-cyclohexanecarboxylate), bis(2,3 - epoxycyclopentyl) ether, butadiene dioxide, phenyl glycidyl ether, 1,2-epoxy-dodecane, and the like.

In addition, the novel vicinal-epoxy polycyclic compounds with or without a polyepoxide such as those illustrated previously, can be reacted with an active organic hardener such as polycarboxylic acids, polycarboxylic acid anhydrides, polyfunctional amines, polyols, polythiols, polyisocyanates, polyacyl halides, and the like, preferably in the presence of a typical epoxy polymerization catalyst, $BF_3$-etherate, under conventional curing conditions, to produce solid epoxy resins which are useful in the laminating, coating, molding, and encapsulating arts.

The following examples are illustrative.

EXAMPLE I

(A) Synthesis of the cyclooctatetraene dimer 217 grams of freshly distilled cyclooctatetraene contained in a flask were heated in an oil bath to 100° C. over a period of 68 hours under oxygen-free conditions. Thereafter unreacted cyclooctatetraene was distilled off at a pressure approximately 1 millimeter of mercury. At the end of the distillation the oil bath temperature was raised to about 60° C. and the pressure reduced to 0.1 millimeter of mercury. There remained in the flask 62 grams of a yellow and viscous oil which was then dissolved in 25 milliliters of ether. This solution was maintained for 24 hours at a temperature of from 0° C. to —5° C. During this time 22 grams of the dimeric cyclooctatetraene crystallized. The crude dimer was recrystalilzed three times from ethanol to give 18 grams of the dimer having a melting point of 75 to 76° C. Infrared analysis and temperature dependent nuclear magnetic resonance spectra confirm the assigned structure.

(B) Synthesis of tricyclo[3.3.2.0$^{4,6}$]deca-2,7,9-triene

In a one liter three necked flask equipped with magnetic stirrer, reflux condenser, nitrogen inlet and an internal ultraviolet lamp equipped with a cooling system were dissolved in 900 milliliters of ether 22 grams of the cyclooctatetraene dimer. The clear solution was irradiated for 24 hours with ultraviolet light. Thereafter, the ether was distilled off over a column under reflux. The liquid residue was then transferred into a small distillation apparatus. Benzene which was generated during the irradiation reaction was distilled off together with a small amount of ether at a pressure of about 20 millimeters of mercury and an oil bath temperature of about 40° C. The benzene ether solution was redistilled and the fraction remaining which had a boiling point of 75 to 80° C. was subjected to infrared spectrum analysis and gas chromatographic analysis. The results of the analysis were identical to those obtained on authentic samples of benzene. The crystalline residue from the distillation was twice sublimated at an oil bath temperature of from 40 to 60° C. and a pressure of from 1 to 14 millimeters of mercury. There was obtained 11.0 grams of the tricyclo-[3.3.2.0$^{4,6}$]deca-2,7,9-triene having a melting point of 93 to 95° C. This represented 80 percent of the theoretical yield. After recrystallization from ethanol and subsequent sublimation, the tricyclo[3.3.2.0$^{4,6}$]deca-2,7,9-triene had a melting point of 95 to 96° C. Upon analysis the product was found to have the following properties and composition: Molecular weight for $C_{10}H_{10}$, Calculated: 130.18. Found 126. Calculated for $C_{10}H_{20}$ (percent): C, 92.26; H, 7.74. Found (percent): C, 92.46; H, 7.85.

Nuclear magnetic resonance (NMR) analysis proved the NMR spectra of tricyclo[3.3.2.0$^{4,6}$]deca-2,7,9-triene to be temperature dependent. For example, the NMR spectra at 100° C. consisted only of a single sharp line at tau 5.8. At —40° C. however, the NMR spectra consisted of a multiplet centered around tau 4.4 and of a multiplet centered around tau 7.9 with relative peak area of 3:2.

EXAMPLE II

Synthesis of 2.6-dibromo-bicyclo[3.3.2]deca-3,7,9-triene ($C_{10}H_{10}Br_2$)

5.2 grams of tricyclo[3.3.2.0$^{4,6}$]deca-2,7,9-triene were dissolved in 150 milliliters of methylenechloride. To this solution were added at —75° C., 6.4 grams of bromine in 50 milliliters of methylenechloride. Thereafter the colorless reaction mixture was warmed to room temperature and the solvent was distilled off under reduced pressure. The partly crystalline, partly oily residue was recrystallized once from petroleum ether yielding 5.8 grams of 2.6-dibromo - bicyclo[3.3.2]deca - 3,7,9 - triene having a melting point of 130°—134° C. Upon analysis the product was found to have the following composition.

Calculated for $C_{10}H_{10}Br_2$ (percent): C, 41.41; H, 3.47; Br, 55.11. Found (percent): C, 41.4; H, 3.55; Br, 55.06. The structure was consistent with ultraviolet, infrared and especially nuclear magnetic resonance data.

EXAMPLE III

Synthesis of bromo-tricyclo[3.3.2.0$^{4,6}$]deca-2,7,9-triene ($C_{10}H_9Br$)

(A) Synthesis of 2.6-dibromo-bicyclo[3.3.2]deca-3,7,9-triene ($C_{10}H_{10}Br_2$).—5.2 grams of tricyclo[3.3.2.0$^{4,6}$] deca-2,7,9-triene were dissolved in 150 milliliters of methylenechloride. To this solution were added at —75° C., 6.4 grams of bromine in 50 milliliters of methylenechloride. Thereafter the colorless reaction mixture was warmed to room temperature and the solvent was distilled off under reduced pressure. The partly crystalline, partly oily residue was recrystallized once from petroleum ether yielding 5.8 grams of 2.6-dibromo-bicyclo[3.3.2]deca-3,7, 9-triene having a melting point of 130°–134° C. Upon analysis the product was found to have the following composition.

Calculated for $C_{10}H_{10}Br_2$ (percent): C, 41.41; H, 3.47; Br, 55.11. Found (percent): C, 41.4; H, 3.55; Br, 55.06. The structure was consistent with ultraviolet, infrared and especially nuclear magnetic resonance data.

(B) Synthesis of bromo-tricyclo[3.3.2.0$^{4,6}$]deca-2,7,9-triene, $C_{10}H_9Br$.—5.8 grams of 2.6 - dibromo - bicyclo [3.3.2]deca-3,7,9-triene were dissolved in 50 milliliters of benzene and added to a solution of about 4.0 grams of potassium-tert-butylate in about 200 milliliters of tert-butanol which was maintained under reflux. Thereafter the reaction mixture was washed for several times with water, the water solution twice extracted with 20 to 30 milliliters of benzene, the benzene solution dried and benzene distilled off. The partly oily, partly crystalline residue was once recrystallized from pentane and once sublimed, yielding 2.9 grams of bromotricyclo[3.3.2.0$^{4,6}$] deca-2,7,9-triene having a melting point of 41° to 43° C. Upon analysis the product was found to have the following composition.

Calculated for $C_{10}H_9Br$ (percent): C, 57.44; H, 4.29; Br, 38.21. Found (percent): C, 57.61; H, 4.36; Br, 37.90. The structure was consistent with ultraviolet, infrared, and especially the temperature-dependent nuclear magnetic resonance data.

EXAMPLE IV

Synthesis of dibromo-tricyclo[3.3.2.0$^{4,6}$]deca-2,7,9-triene ($C_{10}H_8Br_2$)

(A) Synthesis of tribromo - tricyclo[3.3.2.0$^{4,6}$]deca - 2,7 - diene, ($C_{10}H_9Br_3$)—2.1 grams of bromo - tricyclo [3.3.2.0$^{4,6}$]deca-2,7,9-triene were dissolved in 100 milliliters of methylenechloride. To this solution were added at —75° C., 1.6 grams of bromine in 30 milliliters of methylenechloride. Thereafter the colorless reaction mixture was warmed to room temperature and the solvent was distilled off under reduced pressure. The partly crystalline, partly oily residue was recrystallized once from petroleum ether yielding 1.9 grams of tribromo-tricyclo [3.3.2.0$^{4,6}$]deca-2,7-diene having a melting point of 163°–165° C. Upon analysis the product had the following composition.

Calculated for $C_{10}H_9Br_3$ (percent): C, 32.60; H, 2.44; Br, 64.94. Found (percent): C, 32.80; H, 2.54; Br, 64.60. The structure was consistent with ultraviolet, infrared and nuclear magnetic resonance data.

(B) Synthesis of dibromo - tricyclo[3.3.2.0$^{4,6}$]deca - 2,7,9-triene, ($C_{10}H_8Br_2$).—3.7 grams of tribromo-tricyclo [3.3.2.0$^{4,6}$]deca-2,7-diene having a melting point of 163°–165° C. were dissolved in 30 milliliters of benzene and added to a solution of about 4.0 grams of potassium-tert-butylate in 200 milliliters of tert-butanol which was maintained under reflux. Thereafter the reaction mixture was washed for several times with water, the water solution twice extracted with 20 to 30 milliliters of benzene, the benzene solution dried and benzene distilled off. The highly viscous residue was twice distilled in a sublimation apparatus by running water of 0° C. through the cooling finger of the sublimation apparatus. 1.2 grams of dibromo-tricyclo-[3.3.2.0$^{4,6}$]deca-2,7,9-triene were isolated. Upon analysis the product was found to have the following composition: Calculated for $C_{10}H_8Br$ (percent): C, 41.69; H, 2.79; Br, 55.52. Found (percent): C, 41.95; H, 2.90; Br, 55.15. The structure was consistent with ultraviolet, infrared, and especially the temperature dependent nuclear magnetic resonance data.

EXAMPLE V

Synthesis of methoxy-tricyclo[3.3.2.0$^{4,6}$]deca-2,7,9-triene 2.0 grams (51 mmoles) of potassium were dissolved in 25 milliliters of absolute methanol. Thereafter the resulting potassium methoxide was heated for one hour at 90° C. and at a pressure of 0.1 millimeter of mercury. To this solution was added 1.0 gram (4.8 mmoles) of bromo-tricyclo[3.3.2.0$^{4,6}$]deca-2,7,9-triene dissolved in 60 milliliters of dimethylsulfoxide and the mixture stirred at room temperature for 20 hours under an atmosphere of nitrogen. Thereafter the yellow-brown solution was poured into water and extracted with cyclohexane. The organic layer was dried on anhydrous sodium sulfate and the solvent distilled off. The crude product was recrystallized from n-pentane at −15° C. to give a yield of 0.54 grams of methoxy-tricyclo[3.3.2.0$^{4,6}$]deca-2,7,9-triene having a melting point of 23–26° C. The yield obtained represent 70 percent of the theoretical value. The structure was consistent with ultraviolet, infrared and especially the temperature dependent nuclear magnetic resonance data.

EXAMPLE VI

Synthesis of ethoxy-tricyclo[3.3.2.0$^{4,6}$]deca-2,7,9-triene 2.0 grams (51 mmoles) of potassium were dissolved in 25 milliliters of absolute ethanol. Thereafter the resulting potassium ethoxide was heated for one hour at 90° C. and at a pressure of 0.1 millimeter of mercury. To this solution was added 1.0 gram (4.8 mmoles) of bromo-tricyclo[3.3.2.0$^{4,6}$]deca-2,7,9-triene dissolved in 60 milliliters of dimethylsulfoxide and the mixture stirred at room temperature for 20 hours under an atmosphere of nitrogen. Thereafter the mixture was poured into water and extracted with cyclohexane. The organic layer was dried on anhydrous sodium sulfate, the solvent distilled off, and the remaining white crystals sublimed at 60° C. and at a pressure of 0.05 millimeters. The product was recrystallized from cyclohexane to give a yield of 800 milligrams of methoxy-tricyclo[3.3.2.0$^{4,6}$]2,7,9-triene having a melting point of 62–82° C. The yield obtained represent 95 percent of the theoretical value. The structure was consistent with ultraviolet, infrared and especially the temperature dependent nuclear magnetic resonance data.

EXAMPLE VII

Synthesis of isopropoxy-tricyclo[3.3.2.0$^{4,6}$]deca-2,7,9-triene 2.0 grams (51 mmoles) of potassium were dissolved in 25 milliliters of absolute isopropanol. Thereafter the resulting potassium isopropoxide was heated for one hour at 90° C. and at a pressure of 0.1 millimeter of mercury. To this solution was added 1.0 gram (4.8 mmoles) of bromo-tricyclo[3.3.2.0$^{4,6}$]deca-2,7,9-triene dissolved in 60 milliliters of dimethylsulfoxide and the mixture stirred at room temperature for 20 hours under an atmosphere of nitrogen. Thereafter the mixture was poured into water and extracted with cyclohexane. The organic layer was dried on anhydrous sodium sulfate and the solvent distilled off. The resulting oil was distilled in a semi-molecular still to give a yield of 0.73 grams of isopropoxy-tricyclo[3.3.2.0$^{4,6}$]deca-2,7,9-triene having a melting point of 29–32° C. The yield obtained represent 86 percent of the theoretical value. The structure was consistent with ultraviolet, infrared and especially the temperature dependent nuclear magnetic resonance data.

EXAMPLE VIII

Synthesis of tertiary-butoxy-tricyclo[3.3.2.0$^{4,6}$]deca-2,7,9-triene 1.0 gram (26 mmole) of potassium were dissolved in 100 milliliters of tertiary-butanol, the excess alcohol distilled off and the remaining solid heated for one hour at 140° C. and at a pressure of 0.1 millimeter of mercury. Thereafter the solid was suspended by stirring in approximately 50 milliliters of absolute petroleum ether, boiling point 60-80° C. At reflux temperature and under an atmosphere of nitrogen, 0.3 gram (1.43 mmoles) of bromo-tricyclo[3.3.2.0$^{4,6}$]deca-2,7,9-triene dissolved in 20 milliliters of absolute petroleum ether were added to the suspension and refluxing continued for 20 minutes. Thereafter the reaction mixture was poured into water and extracted with n-pentane. The organic layer was dried on anhydrous sodium sulfate and the solvent evaporated. The remaining oil was distilled in a semi-molecular still at 80° C. and at a pressure of 0.01 millimeter of mercury. There was obtained a yield of 135 milligrams of tertiary-butoxy-tricyclo[3.3.2.0$^{4,6}$]deca-2,7,9-triene which represented 47 percent of the theoretical value. The structure was consistent with ultraviolet, infrared, and especially the temperature dependent nuclear magnetic resonance data.

EXAMPLE IX

Synthesis of tertiary-butoxy-tricyclo[3.3.2.0$^{4,6}$]deca-2,7,9-triene 1.8 grams (46 mmoles) of potassium were dissolved in 100 milliliters of tertiary-butanol, the excess alcohol distilled off and the remaining solid heated for one hour at 140° C. and at a pressure of 0.1 millimeter of mercury. Thereafter the solid was suspended by stirring in approximately 50 milliliters of absolute petroleum ether, boiling point 60–80° C. At reflux temperature and under an atmosphere of nitrogen, 1.0 gram (3.45 mmoles) of 4,8-dibromotricyclo[3.3.2]deca-2,7,9-triene dissolved in 75 milliliters of absolute petroleum ether were added and refluxing continued for about 10 minutes. Thereafter the reaction mixture was filtered and the residue washed with benzene. The collected filtrates were then taken to dryness. The remaining oil was distilled in a semi-molecular still at 80° C. and at a pressure of 0.01 millimeters of mercury. There was obtained a yield of 0.58 grams of tertiary-butoxy - tricyclo[3.3.2.0$^{4,6}$]deca - 2,7,9 - triene, which represented 60 percent of the theoretical value. The product had a melting point of 18–20° C. The structure was consistent with ultraviolet, infrared, and especially the temperature dependent nuclear magnetic resonance data.

EXAMPLE X

Synthesis of tertiary-butoxy-tricyclo[3.3.2.0$^{4,6}$]deca-2,7,9-triene, ($C_{14}H_{18}O$)

To a slurry of potassium-tert-butylate in about 100 milliliters of refluxing petroleum ether (boiling range 60°–70° C.) containing no tert-butanol were added 2.9 grams of 2,6-dibromo-bicyclo[3.3.2]deca - 3,7,9 - triene dissolved in several milliliters of benzene. Thereafter the reaction mixture was cooled to room temperature and worked up in the same manner as indicated in the previous examples. The solvent distilled off and the residue was twice sublimed, by running water of 0° C. through the cooling finger of the sublimation apparatus. 1.2 grams of tertiary-butoxy-tricyclo[3.3.2.0$^{4,6}$]deca - 2,7,9 - triene were isolated having a melting point of 16°.19° C. Upon analysis the product was found to have the following composition: Calculated for $C_{14}H_{18}O$ (percent): C, 83.12; H, 8.97; O, 7.91. Found (percent): C, 83.46; H, 8.94; O, 8.17.

EXAMPLE XI

Synthesis of N-dimethylamine-tricyclo[3.3.2.0$^{4,6}$] deca-2,7,9-triene

Into a Carius tube were placed 1.0 gram of dimethylamine and 30 milliliters of ether. Thereafter 50 milliliters of a 1.3 N solution of methyl-lithium in ether was slowly added while the reaction mixture was cooled in an ice-salt bath. After the reaction was complete, solvent and excess amine were evaporated and the lithium dimethylamide dried at room temperature in high vacuum for one hour. Tricyclo[3.3.2.0$^{4,6}$]deca - 2,7,9 - triene (1.0 gram, 4.8 mmoles) was added and about 35 milliliters of dimethylamine condensed into the tube at −60° C. The tube was then sealed and kept at 50° C. for 20 hours. After opening the tube, 20 milliliters of cyclohexane was introduced and the contents filtered. The residue was washed with benzene and the collected filtrates were brought to dryness. Thereafter, the remaining oil was distilled in a semi-molecular still at 80° C. and a pressure of 0.01 millimeters of mercury. There was obtained 0.45 grams of N-dimethylamino - tricyclo[3.3.2.0$^{4,6}$]deca-2,7,9-triene as a colorless oil which was sensitive to air and light. The yield represented 54 percent of the theoretical value. The structure was consistent with ultraviolet, infrared and especially temperature dependent nuclear magnetic resonance data.

EXAMPLE XII

Synthesis of 2-(N-dimethylamino)ethoxy-tricyclo [3.3.2.0$^{4,6}$]deca-2,7,9-triene 1.5 grams (38 mmoles) of potassium were dissolved in 25 milliliters of freshly distilled 2-(N-dimethylamino) ethanol. Excess alcohol was distilled off and the residue heated for two hours at 100° C. and at a pressure of 0.02 millimeters of mercury. 1.0 gram (4.8 mmoles) of bromo-tricyclo[3.3.2.0$^{4,6}$]deca-2,7,9-triene dissolved in 60 milliliters of dimethylsulfoxide was added and the mixture stirred at room temperature for 70 hours. Thereafter the contents of the reaction vessel was poured into water and extracted with cyclohexane. The organic layer was dried on anhydrous sodium sulfate and the solvent distilled off. Thereafter the reaction product was distilled in a semi-molecular still at 80° C. and at a pressure of 0.01 millimeters of mercury to give a yield of 0.85 grams of 2-(N-dimethylamino)ethoxy - tricyclo[3.3.2.0$^{4,6}$]deca-2,7,9-triene as a colorless oil, which darkens on exposure to air or light. The yield obtained represent 82 percent of the theoretical value. The structure was consistent with ultraviolet, infrared and especially the temperature dependent nuclear magnetic resonance data.

EXAMPLE XIII

Synthesis of 3-(N-dimethylamino)propoxy-tricyclo [3.3.2.0$^{4,6}$]deca-2,7,9-triene 1.5 grams (38 mmoles) of potassium were dissolved in 25 milliliters of freshly distilled 3-(N-dimethylamino) propanol. Excess alcohol was distilled off and the potassium 3-(N-dimethylamino)propoxide heated for 2 hours at 100° C. and at a pressure of 0.01 millimeter of mercury. From a dropping funnel 1.0 gram (4.8 mmoles) of bromo-tricyclo[3.3.2.0$^{4,6}$]deca-2,7,9-triene dissolved in 60 milliliters and dimethylsulfoxide was added and the mixture stirred at room temperature for 48 hours. After the reaction was completed the mixture was poured into water and extracted with cyclohexane. The organic layer was then dried on sodium sulfate chromatographed on silica gel. 3 - (N - dimethylamino)propoxy-tricyclo[3.3.2.0$^{4,6}$] deca-2,7,9-triene was eluted from the organic layer with methanol and purified by distillation in a semi-molecular still at 80° C. and at a pressure of 0.01 millimeters of mercury. There was obtained 0.64 gram of 3-(N-dimethylamino)propoxy-tricyclo[3.3.2.0$^{4,6}$]deca-2,7,9-triene as a colorless oil which was sensitive to air and light. The yield obtained represented 58 percent of the theoretical value. The structure was consistent with ultraviolet, infrared and especially the temperature dependent nuclear magnetic resonance data.

EXAMPLE XIV

Synthesis of 3,3-dichloro-tetracyclo[4.3.2.0$^{2,4}$0$^{5,7}$]undeca-8,10-diene ($C_{11}H_{10}Cl_2$)

Dichlorocarbene was prepared according to W. Von E. Doering and A. K. Hoffmann, J. Am. Chem. Soc. 76, 6162 (1954). 3 grams of potassium were dissolved in 100 milliliters of tert-butanol. Thereafter the excess alcohol was distilled off and the white residue was treated at 150° C. and at a pressure of about 0.1 millimeter of mercury for one hour. 1.0 gram of tricyclo[3.3.2.0$^{4,6}$]deca-2,7,9-triene in 50 milliliters of pentane were added at 0° C. Thereafter 10 milliliters of chlorofrom in 20 milliliters of pentane were added dropwise to the well stirred suspension. Finally the reaction mixture was heated to about 40° C. for 30 minutes and thereafter decomposed with water. The water layer was separated, the organic layer washed three times with water and dried. The solvent was then distilled off and the white residue fractionally sublimed yielding as the first fraction 0.6 gram of tricyclo [3.3.2.0$^{4,6}$]deca-2,7,9-triene and as a second fraction 0.4 gram of the dichlorocarbene adduct having a melting point at 92–100° C. The adduct was recrystallized from ethanol and resublimed giving 3.3-dichloro-tetracyclo[4.3.2.0$^{2,4}$ 0$^{5,7}$]undeca-8,10-diene having a melting point of 102° C. Upon analysis the product was found to have the following composition: Calculated for $C_{11}H_{10}Cl_2$ (percent): C, 61.99; H, 4.73; Cl, 33.27. Found (percent): C, 61.92; H, 4.50; Cl, 33.02.

The structure was consistent with ultraviolet, infrared, and especially the temperature dependent nuclear magnetic resonance data.

EXAMPLE XV

Synthesis of 2.3-dihydroxy-tricyclo[3.3.2.0$^{4,6}$]deca-7,9-diene ($C_{10}H_{12}O_2$)

0.7 gram of tricyclo[3.3.2.0$^{4,6}$]deca-2,7,9-triene was dissolved in 8.5 milliliters of ether and 1.5 milliliters of pyridine. Thereafter a solution of 0.8 gram of osmium tetroxide in 8.5 milliliters of ether was added at 0° C. A brown precipitate was formed which was isolated and dried. This substance was dissolved in 50 milliliters of methylene-chloride and decomposed with a solution of 20 milliliters of water, 2 grams of potassium hydroxide and 1.2 grams of mannitol. After shaking the reaction mixture for 30 minutes the methylene-chloride solution was separated and dried. Methylene-chloride was distilled off and the crystalline residue fractionally sublimed. The first fraction yields 0.3 gram of tricyclo[3.2.2.0$^{4,6}$]deca-2,7,9-triene and the second fraction 0.4 gram of 2,3-dihydroxy-tricyclo[3.3.2.0$^{4,6}$]deca-7,9-diene having a melting point at 77–78° C. Upon analysis the product was found to have the following compositions: Calculated for $C_{10}H_{12}O_2$ (percent): C, 73.14; H, 7.33; O, 19.49. Found (percent): C, 73.3; H, 7.40; O, 19.61.

The structure was consistent with ultraviolet, infrared, and especially the temperature dependent nuclear magnetic resonance data.

EXAMPLE XVI

Synthesis of bicyclo[3.3.2]deca-3.7,9-triene ($C_{10}H_{12}$)

2 grams of sodium were dissolved at −75° C. in about 300 milliliters of water-free ammonia. To their solution were added under stirring 1.0 gram of tricyclo [3.3.2.0$^{4,6}$]deca-2,7,9-triene dissolved in about 60 milliliters of tetrahydrofuran. After stirring for 10 minutes the reaction mixture was decomposed at −75° C. with a methanol pentane solution. Thereafter ammonia was distilled off. Finally 100 milliliters of water were added and the organic layer separated. The water layer was extracted once more with about 20 milliliters of pentane. The combined pentane solutions were washed several times with water and dried. Pentane was distilled off over a column and under reflux. The residue was three times sublimed yielding 0.8 gram of bicyclo[3.3.2]deca-3,7,9-triene having a melting point at 44–45° C. Upon analysis the product was found to have the following composition: Calculated for $C_{10}H_{16}$ (percent): C, 90.85; H, 9.15. Found (percent): C, 90.47; H, 9.36; C, 90.64; H, 9.49.

The structure was consistent with ultraviolet, infrared and nuclear magnetic resonance data.

EXAMPLE XVII

Synthesis of tricyclo[3.3.2.0$^{4,6}$]decane ($C_{10}H_{16}$)

1.0 grams of tricyclo[3.3.2.0$^{4,6}$]deca-2,7,9-triene were dissolved in 100 milliliters of methanol. To this solution were added 20 milliliters of water, about 30 milligrams of copper (II) acetate and 20 milliliters of hydrazine. Employing external water cooling about 8 liters of oxygen were bubbled through this solution over a period of about 10 hours. Thereafter 100 milliliters of water was added and the reaction mixture extracted four times with about 30 milliliters of pentane. The combined pentane solutions were washed with water and dried. Pentane was distilled off and the white and crystalline residue was twice sublimed yielding 0.6 grams of tricyclo[3.3.2.0$^{4,6}$]-decane having a melting point of 125° C. Upon analysis the product had the following composition: Calculated for $C_{10}H_{16}$ (percent): C, 88.16; H, 11.84. Found (percent): C, 87.95; H, 11.97.

The structure was consistent with infrared and nuclear magnetic resonance data.

EXAMPLE XVIII

Synthesis of tetracyclo[5.3.2.0$^{2,5}$0$^{6,8}$]dodeca-3,9,11-triene ($C_{12}H_{12}$)

(A) Synthesis of the Diels-Alder-adduct of acetylenedicarboxylicester and pentacyclo[9.3.2.0$^{2,9}$0$^{3,8}$0$^{10,12}$]heaxdeca-4,6,13,15-tetraene, $C_{22}H_{12}O_4$—6.0 grams of pentacyclo[9.3.2.0$^{2,9}$0$^{3,8}$0$^{10,12}$]hexadeca-4,6,13,15 - tetraene(dimeric-cyclooctatetraene of melting point 76° C.) were dissolved in 10 milliliters of benzene. To this solution were added 4.5 grams of freshly distilled acetylenedicarboxylic acid dimethylester. The Diels-Alder reaction started immediately which was noted by an increase in temperature. Care should be taken that the reaction temperature does not exceed 50°–60° C. After the Diels-Alder reaction has finished the mixture was allowed to stand for about 4 hours at room temperature. Thereafter the mixture was heated to 100° C. at a pressure of about 0.1 millimeter of mercury. On cooling the residue solidified. The Diels-Alder adduct was once recrystallized from petroleum ether yielding 9.0 grams of a product having a melting point of 118–120° C. Upon analysis the product was found to have the following composition: Calculated for $C_{22}H_{22}O_4$ (percent): C, 75.41; H, 6.33; O, 18.26. Found (percent): C, 75.60; H, 6.19; O, 18.34.

(B) Synthesis of tetracyclo[5.3.2.0$^{2,5}$0$^{6,8}$]dodeca-3,9,11-triene, ($C_{12}H_{12}$).—11.5 grams of the Diels-Alder adduct $C_{22}H_{22}O_4$ were pyrolyzed in a small distillation apparatus. The temperature range for this pyrolysis was 140°–200° C., the pressure about 0.1 millimeters. The distilled reaction product represents a mixture of phthalic acid dimethylester and tetracyclo[5.3.2.0$^{2,5}$0$^{6,8}$]dodeca-3,9,11-triene. The mixture was fractionally distilled several times yielding 4.2 grams of a lower boiling fraction having a melting point of 22° C. which showed in its infrared spectrum no absorption in the carboxylic ester region. Upon analysis the product was found to have the following composition: Calculated for $C_{12}H_{12}$ (percent): C, 92.26; H, 7.74. Found (percent): C, 92.10; H, 7.67.

The higher boiling fraction was according to its infrared spectrum and its retention time in the gas chromatogram identical with an authentic sample of phthalic acid dimethylester.

Although the invention has been illustrated by the preceding examples, the invention is not to be construed as limited to the materials or conditions employed herein, but rather the invention encompasses the generic area as hereinbefore disclosed. Various modifications and embodiments of this invention can be made without departing from the spirit and scope thereof.

What is claimed is:
1. Tricyclo[3.3.2.0$^{4,6}$]deca-2,7,9-triene.

References Cited

UNITED STATES PATENTS 3,288,869   11/1966   Schroeder           260—666

OTHER REFERENCES

Doering et al., Angew. Chem. Internat. Ed., vol. 2, p. 122 (1963).

Doering et al., Tetrahedron, vol. 19, pp. 727–729 (1963).

Schroder, Angew. Chem. Internat. Ed., vol. 2, pp 481–482 (1963).

Schroder et al., Tetrahedron Letters, vol. 14, pp. 773–777 (1964).

HOWARD T. MARS, Primary Examiner

U.S. Cl. X.R.

204—162, 163; 260—2, 348, 465, 468, 514, 563, 586, 611, 617, 648, 668